(12) United States Patent
Hasler

(10) Patent No.: US 8,207,712 B2
(45) Date of Patent: Jun. 26, 2012

(54) ARRANGEMENT FOR EXCHANGING POWER

(75) Inventor: Jean-Philippe Hasler, Vasteras (SE)

(73) Assignee: ABB Technology AG (CH)

( * ) Notice: Subject to any disclaimer, the term of this patent is extended or adjusted under 35 U.S.C. 154(b) by 0 days.

(21) Appl. No.: 13/269,149

(22) Filed: Oct. 7, 2011

(65) Prior Publication Data

US 2012/0069612 A1 Mar. 22, 2012

Related U.S. Application Data

(63) Continuation of application No. PCT/EP2009/054330, filed on Apr. 9, 2009.

(51) Int. Cl.
*G05F 1/70* (2006.01)
*H02M 1/12* (2006.01)

(52) U.S. Cl. .......................................... 323/208; 363/39

(58) Field of Classification Search .......... 323/205–211; 363/39–48
See application file for complete search history.

(56) References Cited

U.S. PATENT DOCUMENTS

| | | | |
|---|---|---|---|
| 5,532,575 A | 7/1996 | Ainsworth et al. | |
| 5,574,356 A * | 11/1996 | Parker | 323/207 |
| 6,829,544 B1 * | 12/2004 | Kasztenny et al. | 702/59 |
| 7,050,311 B2 * | 5/2006 | Lai et al. | 363/37 |
| 7,187,149 B1 * | 3/2007 | Balog et al. | 318/434 |
| 2008/0007230 A1 * | 1/2008 | Kalyuzhny et al. | 323/205 |

FOREIGN PATENT DOCUMENTS

WO 0227910 A2 4/2002

OTHER PUBLICATIONS

Peng, et al.; "A Multilevel Voltage-Source inverter with Separate DC Sources for Static Var Generation"; 1995 IEEE, pp. 2541-2548.
Fujii, et al; "A Novel DC-link Voltage Control of PWM-Switched Cascade Cell Multi-Level Inverter Applied to STATCOM"; Industry Applications Conference 2005; pp. 961-967.
Li, et al.; "APF Based on Multilevel Voltage Source Cascade Converter with Carrier Phase Shifted SPWM"; IEEE Tencon 2003; pp. 264-267.
Bhadkamkar, et al.; "Application of Zig-Zag Transformers in a Three-Wire Three-Phase Dynamic Sag Corrector System"; Annual Power Electronics Specialists Conference; IEEE vol. 3; Jun. 2003; pp. 1260-1265.

(Continued)

*Primary Examiner* — Jessica Han
(74) *Attorney, Agent, or Firm* — St. Onge Steward Johnston & Reens LLC

(57) ABSTRACT

An arrangement for exchanging power with a three-phase electric power network includes a Voltage Source Converter having three phase legs with each a series connection of switching cells. The three phase legs are interconnected in a neutral point by forming a wye-connection. The arrangement also includes a device connected to the neutral point of the converter and configured to provide a current path for a zero-sequence current. A control unit is configured to calculate a value for amplitude and phase position for a zero-sequence current for which, when added to said three phase legs upon generation of a negative-sequence current, the resulting energy stored in energy storing capacitors in each phase leg will be constant and to control semiconductor devices of said switching cells to add such a zero-sequence current to the currents of each phase leg of the converter.

13 Claims, 2 Drawing Sheets

OTHER PUBLICATIONS

Fang, et al.; "Dynamic Performance and Control of a Static Var Generator Using Cascade Multilevel Inverters"; Conference Record of the 1996 IEEE Industry Applications Conference; 1996; pp. 1009-1015.

International Search Report and Written Opinion of the International Searching Authority; Application No. PCT/EP2009/054330; Completion Date: Mar. 3, 2010; Mailing Date: Mar. 9, 2010; 14 pages.

* cited by examiner

US 8,207,712 B2

ARRANGEMENT FOR EXCHANGING POWER

CROSS-REFERENCE TO RELATED APPLICATIONS

The present application is a continuation of pending International patent application PCT/EP2009/054330 filed on Apr. 9, 2009 which designates the United States, the content of which is incorporated herein by reference.

FIELD OF THE INVENTION

The present invention relates to the technical field of exchanging power with a three-phase electric power network with different aims, such as for obtaining reactive power compensation, stabilize the electric power network and reduce disturbances therein, such as reducing harmonics in the network generated by a load connected thereto.

Compensation of reactive power flows in electric power networks conventionally occurs, inter alia, by connection of reactive impedance elements in the form of inductors and capacitors in shunt connection to the power network. By connecting a semiconductor switch in series with such an inductor the current through the inductor may be controlled and hence also the exchange of reactive power with said network. By connecting a semiconductor switch in series with such a capacitor and control thereof reactive power supply to the power network may be controlled in steps. Capacitors connected in shunt connection are used primarily in industrial networks to compensate for reactive power consumption in for example large asynchronous motors. Another application of such an arrangement is in connection with loads with a greatly varying reactive power consumption, such as in industrial arc furnaces, where instability with respect to power transmitted through the different phases of the network may occur.

BACKGROUND OF THE INVENTION

The present invention relates more specifically to an arrangement for exchanging power in shunt connection, with a three-phase electric power network, said arrangement comprising: a Voltage Source Converter having three phase legs with each a series connection of switching cells in the form of so-called H-bridges comprising two switching elements connected in parallel and each having at least two semiconductor assemblies connected in series and having each a semiconductor device of turn-off type and a rectifying element connected in anti-parallel therewith, each said switching cell further comprising at least one energy storing capacitor connected in parallel with said switching elements, mid points between semiconductor assemblies of each switching element forming terminals of the switching cell for connection to corresponding terminals of adjacent switching cells for forming said series connection of switching cells, in which the three phase legs of the Voltage Source Converter are interconnected in a neutral point by forming a wye-connection, means configured to detect electrical conditions of said three-phase electric power network, and a control unit configured to control said semiconductor devices of said semiconductor assemblies of each switching cell and by that each switching cell dependent upon information received from said detecting means to deliver a voltage across the terminals of each said switching cell being zero, +U or −U, in which U is the voltage across said capacitor, for together with other switching cells of the phase leg deliver a voltage pulse being the sum of the voltages so delivered by each switching cell.

Such an arrangement is already known through for example U.S. Pat. No. 5,532,575 and the article "A Multilevel Voltage-Source inverter with Separate DC Sources for Static Var Generation", 1995 IEEE, pages 2541-2548. An advantage of utilizing a Voltage Source Converter of this type in an arrangement for exchanging power with a three-phase electric power network is that already at a comparatively low number of such switching cells connected in series a comparatively high number of different levels of said voltage pulse delivered by the converter may be obtained, so that a said voltage with fundamental frequency having a shape being very close to a sinusoidal voltage may be obtained already without any smoothing filters. Furthermore, this may be obtained already by means of substantially lower switching frequencies than used in two or three level Voltage Source Converters. Furthermore, this makes it possible to obtain substantially lower losses and also reduces problems of filtering and harmonic currents and radio interferences, so that equipment therefor may be less costly. This altogether results in both a better performance of the arrangement and saving of costs with respect to such arrangements having converters with no energy storing capacitors built in into the switching cells.

It is of importance for reliable and efficient operation of such an arrangement that the energy stored in the capacitor of each switching cell of the converter is kept constant for keeping the direct voltage of each said cell constant. This implies that the wye-connected converter can in known arrangements of this type only generate reactive power, i.e. the current component is a positive-sequence current and is in quadrature to the voltage at the respective phase leg terminal of the converter. This is due to the fact that when a negative-sequence current is generated by a wye-connected converter and a positive-sequence voltage is assumed, then the energy in said capacitors will increase/decrease between phases resulting in direct voltage variations across the capacitors.

However, it may in some situations be very important to be able to create a negative-sequence current in order to move power from one of the phases of the power network to the other for obtaining balance of the power flow in a disturbed network or otherwise reducing disturbances in the network. In order to keep the energy of each said capacitor constant when generating a negative-sequence current it is then necessary to transfer energy between the phases of the converter. One method of doing this would consist of adding a zero-sequence voltage component to each phase leg leaving the potential of the neutral to that zero-sequence. However, this method requires a high number of switching cells due to the added voltage and present limit in the positive-sequence/negative-sequence current to be generated by the converter.

SUMMARY OF THE INVENTION

The object of the present invention is to provide an arrangement of the type disclosed above advising an improvement with respect to above when a need to generate a negative-sequence current arises.

This object is according to the invention obtained by providing such an arrangement, which further comprises a device connected to said neutral point of the wye-connected Voltage Source Converter and configured to provide a current path for a zero-sequence current between this neutral point and said three-phase power network connected to the arrangement, and said control unit is configured, upon receipt of information from said detecting means causing a need to generate a negative-sequence current, to calculate a value for amplitude and phase position for a zero-sequence current for which, when added to said three phase legs upon generation of said negative-sequence current, the resulting energy stored in said energy storing capacitors in each said phase leg will be constant and to control the semiconductor devices of said switching cells of the phase legs to add such a zero-sequence current to the currents of each phase leg of the converter.

By providing the arrangement with such a device and designing the control unit to calculate said zero-sequence current and control said semiconductor devices to add this zero-sequence current to the currents of each phase leg of the converter a negative-sequence current may be generated when a need thereof arises and determination of the appearance of said zero-sequence current will ensure that the voltage and the current in each phase will be in quadrature and by that no charging or discharging of any said capacitor will occur, so that the resulting energy stored in the capacitors in each phase will be constant. This is obtained without any requirement of extra cells in the series connection of switching cells. Disturbances in said power network, for instance due to great variations in the power consumption of an electric arc furnace connected thereto or flicker, may be compensated by creating a negative-sequence current moving power from one of the phases to another by just carrying out such calculation and control of semiconductor devices of the switching cells for the negative-sequence current desired to be generated.

According to an embodiment of the invention said device is a step-down transformer connected to the three-phase electric power network, and a neutral of this transformer is connected to said neutral point of the wye-connected Voltage Source Converter. This constitutes a reliable and cost efficient way to providing the current path required for a zero-sequence current between the neutral point of the wye-connection of the converter and the three-phase power network. Another advantageous choice of such a device is a so-called grounding transformer of type zig-zag connected to the three-phase electric power network. Yet another advantageous choice of such a device is a grounding transformer of type YN-D connected to the three-phase electric power network.

According to another embodiment of the invention each phase leg of the Voltage Source Converter has a reactive impedance element connected in series therewith for influencing the flow of reactive power between the arrangement and said network, and this reactive impedance element comprises according to another embodiment of the invention a capacitor and to a further embodiment of the invention an inductor for reactive power generation and consumption of reactive power, respectively.

According to another embodiment of the invention the number of switching cells of said series connection of switching cells in each phase leg of the Voltage Source Converter is substantially proportional to the supply voltage of the three-phase electric power network. Although a cost saving of an arrangement of this type is obtained by the reduced number of switching cells connected in series required, the use of a converter of this type is particularly interesting when the number of switching cells in said series connection is rather high resulting in a high number of possible levels of the voltage pulses delivered by the converter.

According to another embodiment of the invention said semi-conductor devices of said semiconductor assemblies are IGBTs (Insulated Gate Bipolar Transistor), IGCTs (Integrated Gate Commutated Thyristor) or GTOs (Gate Turn-Off thyristor). These are suitable semiconductor devices for such converters, although other semiconductor devices of turn-off type are also conceivable.

According to another embodiment of the invention said Voltage Source Converter has a capacity to together with said reactive impedance element connected in series therewith generate a voltage with a fundamental frequency being equal to the fundamental frequency of the voltage of the respective phase of the electric power network with an amplitude of 10 kV-500 kV, preferably 30 kV-200 kV. Such an arrangement will be suitable for exchanging power with for instance a high-voltage transmission line typically carrying a voltage of 132-500 kV or a power network feeding an industrial arc furnace with a fundamental voltage of 72 kV.

The present invention also relates to a method of generating a negative-sequence current in an arrangement for exchanging power, in shunt connection, with a three-phase electric power network according to the appended method claim. The advantages and advantageous features of such a method appear clearly from the above discussion of the different embodiments of an arrangement according to the invention.

The invention also relates to a use of an arrangement according to the invention for exchanging power with a three-phase electric power network, in which preferable such uses are for exchanging power with a power network feeding an industrial arc furnace and with a three-phase electric power network in the form of a high-voltage transmission line.

Further advantages as well as advantageous features of the invention will appear from the following description.

BRIEF DESCRIPTION OF THE DRAWINGS

With reference to the appended drawings, below follows a specific description of embodiments of the invention cited as examples.

In the drawings.

DETAILED DESCRIPTION OF THE INVENTION

Figure 1:
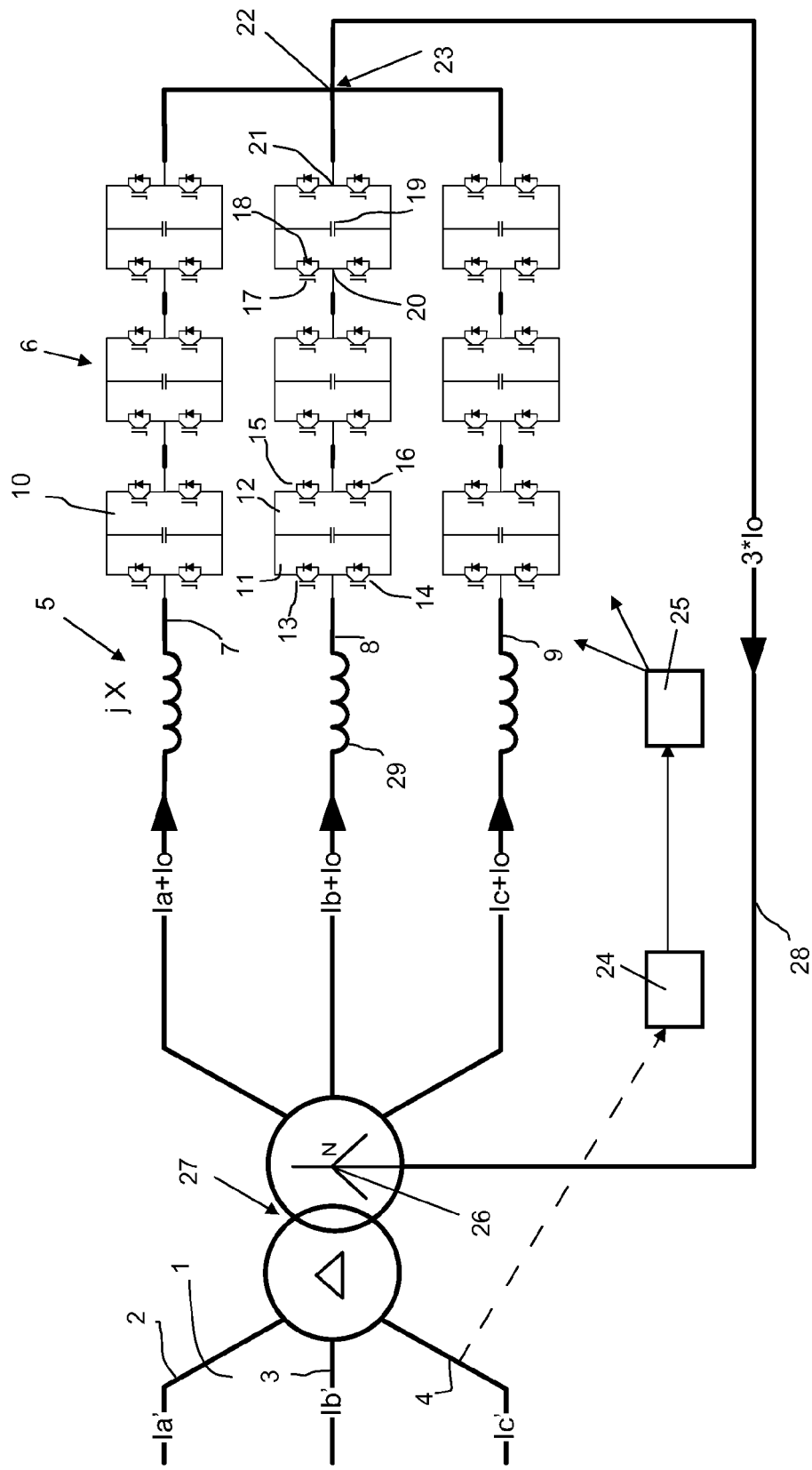
FIG. 1 is a very simplified view showing the general structure of an arrangement according to a first embodiment of the invention.

FIG. 1 schematically illustrates the general structure of an arrangement according to a first embodiment of the invention for exchanging power, in shunt connection, with a three-phase electric power network 1 with the three phases 2, 3, 4. The arrangement 5 comprises a Voltage Source Converter 6 having three phase legs 7-9 with each a series connection of switching cells 10, of which only three are shown for the sake of simplicity of the drawing, but the number thereof may be any conceivable and is normally in the order of 10 to 100.

Each switching cell has the form of a so called H-bridge comprising two switching elements 11, 12 connected in parallel and each having at least two semiconductor assemblies 13-16 connected in series and having each a semiconductor device 17 of turn-off type, such as for instance an IGBT, and a rectifying element 18, such as a free-wheeling diode, connected in anti-parallel therewith. Each switching cell further comprises at least one energy storing capacitor 19 having a voltage across the terminals thereof of U and connected in parallel with the switching elements. Mid points 20, 21 between semiconductor assemblies of each switching element form terminals of the switching cell for connection to corresponding terminals of adjacent switching cells for forming a series connection of switching cells. Thus, each phase leg of the converter is formed by a so-called chain-link of H-bridge cells. The three phase legs 7-9 of the converter are interconnected in a neutral point 22 forming wye-connection 23.

A means 24 configured to detect electrical conditions of said three-phase electric power network is indicated at 24. Such conditions may be amplitudes and phase positions of currents and voltages in the three phases, through which also disturbances and harmonics may be discovered. The detecting means 24 is configured to send information about said electrical conditions further to a control unit 25, which is configured to control the semiconductor devices of the switching assemblies of each switching cell and by that each switching cell dependent upon information received from the detecting means 24 to deliver a voltage across the terminals of each said switching cell being zero, +U or −U, in which U is the voltage across the capacitor 19 of the switching cell, for together with other switching cells of the respective phase leg 7-9 deliver a voltage pulse being the sum of the voltages so delivered by each switching cell.

The neutral point 22 of the wye-connected converter is connected to a neutral 26 of a step-down transformer 27 connecting said arrangement to the three-phase power network 1. A current path 28 for a zero-sequence current is formed between the neutral point 22 of the converter and the three-phase power network 1. This enables generation of a negative-sequence current of a desired value without for that sake causing direct voltage variations across the energy storing capacitors, so that the resulting energy stored in the capacitors in each phase will be kept constant. More exactly, this is in the present invention obtained by configuring the control unit 25 to control the semiconductor devices 17 of the semiconductor assemblies as follows. The detecting means 24 send substantially continuously information about the electrical conditions of the three-phase electric power network to the control unit 25. Based on this information the control unit determines how to control said semiconductor devices for obtaining for instance a negative-sequence current when an unbalance between the phases has been detected and there is a need to move power from one phase to another. When such a need has been determined the control unit will also calculate a value for amplitude and phase position for a zero-sequence current for which, when added to said three-phase legs upon generation of said negative-sequence current determined to be suitable to generate, the resulting energy stored in said energy storing capacitors in each said phase leg will be constant. Thus, for a certain such negative-sequence current there will be a zero-sequence current which when added to the currents in the respective phase will result in quadrature of the current to the voltage in each phase and by that no discharging or charging of the capacitors. The control unit will then control the semiconductor devices of said switching cells of the phase legs to generate said negative-sequence current and add such a zero-sequence current $I_o$ to the currents of each phase leg of the converter. Accordingly, balance between the phases of the three-phase electric power network has been obtained by generating of said negative-sequence current and it will be ensured that the resulting energy stored in the capacitors in each phase will be constant.

Figure 2:
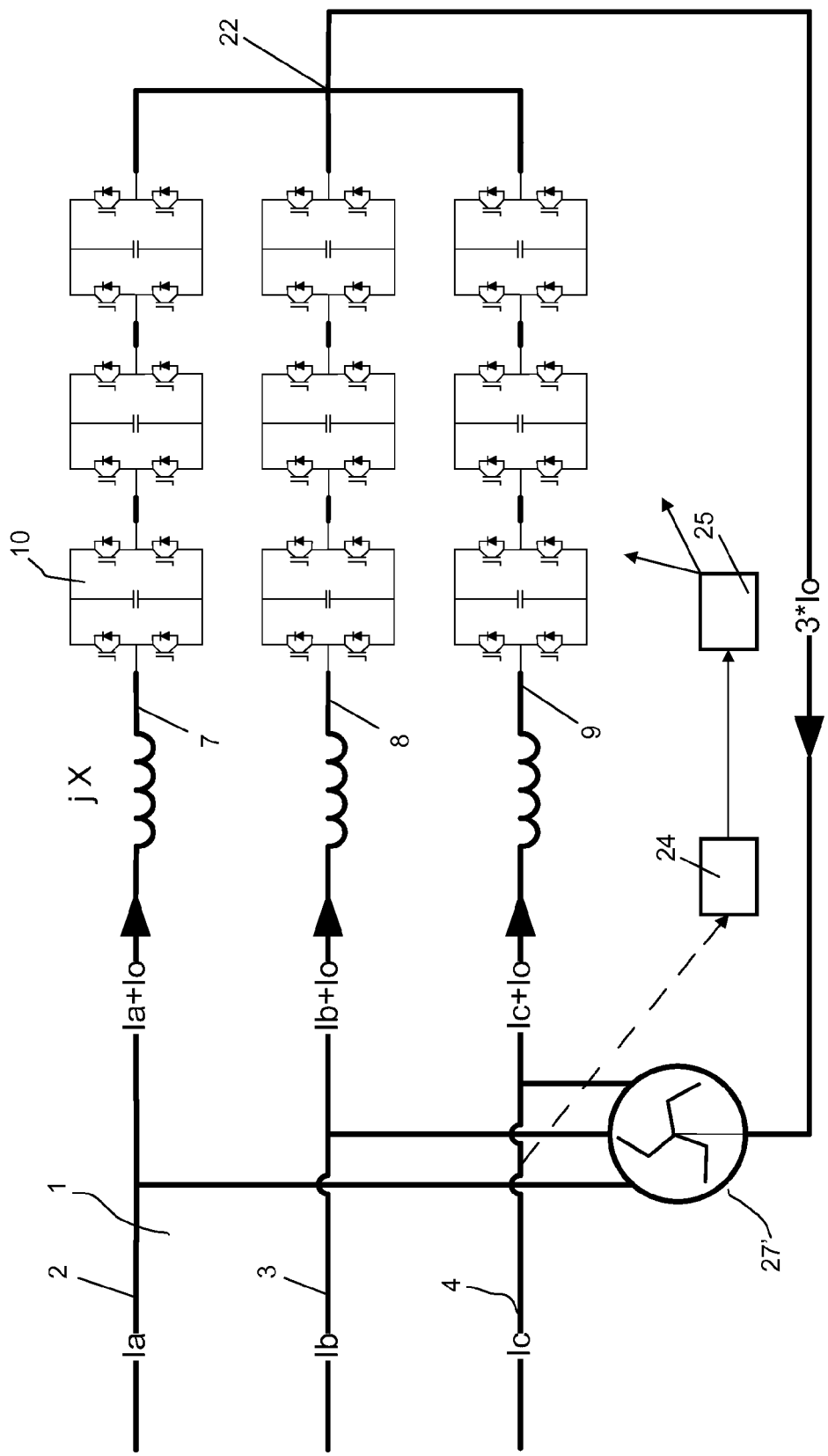
FIG. 2 is a view similar to FIG. 1 of an arrangement according to a second embodiment of the invention.

FIG. 2 shows an arrangement according to a second embodiment of the invention, which differs from the one according to FIG. 1 only by the replacement of the step-down transformer by a so-called grounding transformer 27' of the zig-zag type, to which the neutral point 22 of the converter is connected and which is connected to the three-phase electric power network 2. The general function of the arrangement according to this embodiment will be the same as that of the embodiment shown in FIG. 1, and the same reference numerals have for that sake been used in this Figure.

It is pointed out that although particular measures have been taken when designing the arrangement according to the invention for obtaining generation of a negative-sequence current the arrangement may be used for other types of influences upon the properties of the electric power network, such as for reactive power compensation and for reducing harmonics in the electric power network, which may be generated by a load connected thereto. The arrangements may for this sake also have reactive impedance elements connected in series with each phase leg of the converter, such as an inductor for reactive power consumption and a capacitor for reactive power generation, and such a reactive impedance element in the form of an inductor 29 is indicated in the Figures. This inductor may also function for smoothing the voltage generated by the converter.

The invention is of course not in any way restricted to the embodiments described above, but many possibilities to modifications thereof will be apparent to a person skilled in the art without departing from the scope of the invention as defined in the appended claims.

What is claimed is:

1. An arrangement for exchanging power, in shunt connection, with a three-phase electric power network, said arrangement comprising:
   a Voltage Source Converter having three phase legs with each a series connection of switching cells in the form of so-called H-bridges comprising two switching elements connected in parallel and each having at least two semiconductor assemblies connected in series and having each a semiconductor device of turn-off type and a rectifying element connected in anti-parallel therewith, each said switching cell further comprising at least one energy storing capacitor connected in parallel with said switching elements, mid points between semiconductor assemblies of each switching element forming terminals of the switching cell for connection to corresponding, terminals of adjacent switching cells for forming said series connection of switching cells, in which the three phase legs of the Voltage Source Converter are interconnected in a neutral point by forming a wye-connection,
   device configured to detect electrical conditions of said three-phase electric power network, and
   a control unit configured to control said semiconductor devices of said semiconductor assemblies of each switching cell and by that each switching cell dependent upon information received from said detecting means to deliver a voltage across the terminals of each said switching cell being zero, +U or −U, in which U is the voltage across said capacitor, for together with other switching cells of the phase leg deliver a voltage pulse being the sum of the voltages so delivered by each switching cell,
   characterized in that the arrangement further comprises a device connected to said neutral point of the wye-connected Voltage Source Converter and configured to provide a current path for a zero-sequence current, and that said control unit is configured, upon receipt of information from said detecting device causing a need to generate a negative-sequence current, to calculate a value for amplitude and phase position for a zero-sequence current for which, when added to said three phase legs upon generation of said negative-sequence current, the resulting energy stored in said energy storing capacitors in each said phase leg will be constant and to control the semiconductor devices of said switching cells of the phase legs to add such a zero-sequence current to the currents of each phase leg of the converter.

2. The arrangement according to claim 1, provided as a step-down transformer connected to the three-phase electric power network, and that a neutral of this transformer is connected to said neutral point of the wye-connected Voltage Source Converter.

3. The arrangement according to claim 1, provided as a so-called grounding transformer of zig-zag type connected to the three-phase electric power network.

4. The arrangement according to claim 1, characterized in that each phase leg of the Voltage Source Converter has a reactive impedance element connected in series therewith.

5. The arrangement according to claim 4, characterized in that said reactive impedance element comprises an inductor.

6. The arrangement according to claim 4, characterized in that said reactive impedance element comprises a capacitor.

7. The arrangement according to claim 1, characterized in that the number of switching cells in each phase leg of said Voltage Source Converter is substantially proportional to the supply voltage.

8. The arrangement according to claim 1, characterized in that said semiconductor devices of said semiconductor assemblies are IGBTs (Insulated Gate Bipolar Transistor), IGCTs (Integrated Gate Commutated Thyristor) or GTOs (Gate Turn-Off thyristor).

9. The arrangement according to claim 1, characterized in that said Voltage Source Converter has a capacity to together with said reactive impedance element connected in series therewith generate a voltage with a fundamental frequency being equal to the fundamental frequency of the voltage of the respective phase of the electric power network with an amplitude of 10 kV-500 kV, preferably 30 kV-200 kV.

10. A use of an arrangement according to claim 1, for exchanging power with a three-phase electric power network.

11. The use according to claim 10, in which said power net-work is feeding an industrial arc furnace and typically carries a voltage of 12-72 kV.

12. The use according to claim 11 for exchanging power with a three-phase electric power network in the form of a high-voltage transmission line, which typically carries a voltage of 63-500 kV.

13. A method of generating a negative-sequence current in an arrangement for exchanging power, in shunt connection, with a three-phase electric power network, in which said arrangement comprises: a Voltage Source Converter having three phase legs with each a series connection of switching cells in the form of so-called H-bridges comprising two switching elements connected in parallel and each having at least two semiconductor assemblies connected in series and having each a semiconductor device of turn-off type and a rectifying element connected in anti-parallel therewith, each said switching cell further comprising at least one energy storing capacitor connected in parallel with said switching elements, mid points between semiconductor assemblies of each switching element forming terminals of the switching cell for connection to corresponding terminals of adjacent switching cells for forming said series connection of switching cells, in which the three phase legs of the Voltage Source Converter are interconnected in a neutral point by forming a wye-connection, said method comprises the steps:

detecting electrical conditions of said three-phase electric power network, and controlling said semiconductor devices of said semiconductor assemblies of each switching cell and by that each switching cell dependent upon information from said detection to deliver a voltage across the terminals of each said switching cell being zero, +U or −U, in which U is the voltage across said capacitor, for together with other switching cells of the phase leg deliver a voltage pulse being the sum of the voltages so delivered by each switching cell, characterized in that it comprises the further steps:

providing a current path for a zero-sequence current, calculating, upon detection of a need to generate a negative sequence current, a value for amplitude and phase position for a zero-sequence current for which, when added to said three-phase legs upon generation of said negative sequence current, the resulting energy stored in said energy storing capacitors in each said phase leg will be constant, and controlling the semiconductor devices of said switching cells of the phase legs to add such a zero-sequence current calculated to the currents of each phase leg of the converter.

* * * * *